(12) United States Patent
Suefuji

(10) Patent No.: US 8,800,995 B2
(45) Date of Patent: Aug. 12, 2014

(54) MECHANICAL SEAL DEVICE

(75) Inventor: Yoshihiro Suefuji, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 283 days.

(21) Appl. No.: 13/257,618

(22) PCT Filed: Apr. 21, 2010

(86) PCT No.: PCT/JP2010/057056
§ 371 (c)(1),
(2), (4) Date: Sep. 20, 2011

(87) PCT Pub. No.: WO2010/123025
PCT Pub. Date: Oct. 28, 2010

(65) Prior Publication Data
US 2012/0139186 A1    Jun. 7, 2012

(30) Foreign Application Priority Data
Apr. 23, 2009    (JP) .................. 2009-105169

(51) Int. Cl.
*F16J 15/34*    (2006.01)
*F16J 15/36*    (2006.01)

(52) U.S. Cl.
CPC ............... *F16J 15/342* (2013.01); *F16J 15/36* (2013.01); *F16J 15/34* (2013.01)
USPC ........................................ 277/401

(58) Field of Classification Search
CPC ..... F16J 15/34; F16J 15/3464; F16J 15/3468; F16J 15/36; F16J 15/363; F16J 15/342
USPC .................. 277/370, 359, 408, 401
See application file for complete search history.

(56) References Cited

U.S. PATENT DOCUMENTS

| | | | | |
|---|---|---|---|---|
| 2,903,970 A | * | 9/1959 | Elovitz et al. | 415/26 |
| 2,949,321 A | * | 8/1960 | Tracy | 277/408 |
| 3,495,620 A | * | 2/1970 | Bazell et al. | 137/529 |
| 4,335,888 A | * | 6/1982 | Ohba et al. | 277/306 |

(Continued)

FOREIGN PATENT DOCUMENTS

| | | |
|---|---|---|
| FR | 1268692 | 8/1961 |
| FR | 1268692 A | 8/1961 |

(Continued)

OTHER PUBLICATIONS

Office action mailed Mar. 5, 2014 in counterpart European application, 7 pages.

*Primary Examiner* — Vishal Patel
(74) *Attorney, Agent, or Firm* — Harness, Dickey & Pierce, P.L.C.

(57) ABSTRACT

Provided is a small mechanical seal device which can efficiently wash a sealing surface, and can appropriately seal a sealed fluid and a quenching liquid. In a mechanical seal device (1), two sealing surfaces, i.e., an objective fluid sealing surface (131) and a quenching fluid sealing surface (132) are formed in a stationary sealing ring (130), and a quenching fluid passes through a sealing groove (133) provided between the sealing surfaces. Quenching bores (134) which penetrate through the stationary sealing ring (130) in the axial direction are formed in the stationary sealing ring (130). The quenching fluid passes between an intermediate chamber (C) provided on the back side of the stationary sealing ring (130) and the sealing groove (133) via the quenching bores (134).

5 Claims, 3 Drawing Sheets

(56) References Cited

U.S. PATENT DOCUMENTS

| | | | | |
|---|---|---|---|---|
| 4,688,806 A * | 8/1987 | Heilala | | 277/389 |
| 4,973,065 A * | 11/1990 | Habich | | 277/399 |
| 5,052,694 A * | 10/1991 | Lipschitz | | 277/388 |
| 6,494,460 B2 * | 12/2002 | Uth | | 277/399 |
| 7,044,470 B2 * | 5/2006 | Zheng | | 277/400 |
| 2009/0085300 A1 * | 4/2009 | Takahashi | | 277/391 |

FOREIGN PATENT DOCUMENTS

| | | |
|---|---|---|
| JP | S55-76958 | 11/1978 |
| JP | 07208612 | 8/1995 |
| WO | 2006/137305 A1 | 12/2006 |

* cited by examiner

US 8,800,995 B2

MECHANICAL SEAL DEVICE

TECHNICAL FIELD

The present invention relates to a mechanical seal device preferably applied to a shaft seal for a centrifugal pump, an agitation apparatus and the like.

BACKGROUND ART

Conventionally, while sealing sealing-fluid (sealed fluid) including slurry, there is a possibility that the slurry accumulates between parts of the apparatus, and a possibility that solidified material of the sealing-fluid adheres on a seal surface or clogs a space between the parts of the apparatus. Therefore, for such sealing-fluid, especially for liquid which deposits when it leaks into the atmosphere, it is necessary to execute quenching to wash deposited material away. To do this, an extra seal for quenching fluid becomes necessary, so that a double mechanical seal in which two mechanical seals are arranged in a linear manner is conventionally general for the seal.

Further, an another mechanical seal device is also disclosed for the seal, the mechanical seal device having a constitution that a flashing passage is provided in a seal cover, and inner circumference surfaces of a stationary seal ring and a rotary seal ring on which the sealed fluid contacts are washed with flashing fluid (refer PCT International Publication WO2006/137305 (Patent Document 1)).

Patent Document 1: PCT International Publication WO2006/137305

DISCLOSURE OF INVENTION

Problems to be Solved by the Invention

However, in the mechanical seal device with two mechanical seal arranged in a linear manner, there is a problem that, since length in the axial direction thereof becomes longer, it may be unable to be mounted on the centrifugal pump or the like.

Further, in a mechanical seal device, for example, disclosed in the Patent Document 1, there is a problem that, since the flow passage for flashing fluid (quenching fluid) is long, it is difficult to efficiently wash the deposited material away.

Further, in the seal device in which such quenching is executed, there is the following problem. Since there is a possibility that the quenching fluid leaks into the inside space of the apparatus or the outside space of the apparatus, it is necessary to seal the quenching fluid as strict as the sealing-fluid, and, as a result, constitution of the seal device becomes complex and large.

Still further, in a conventional mechanical seal device in which a packing is used as a secondary seal of a seal ring movable in the axial direction, there is the following problem. In the case the sealed fluid includes the slurry, the slurry may accumulate between the packing and the shaft, the solidified material may deposit between the packing and the shaft, and, as a result, performance of actuation of the secondary seal deteriorates and there is a possibility that the sealing-fluid leaks.

The present invention has been made in view of the above problems, and its purpose is to provide a mechanical seal device, being compact, able to wash the seal surface efficiently, able to achieve appropriate shutoff between the sealing-fluid and the atmosphere, and, able to prevent the quenching fluid from leaking into the inside space or the outside space.

Means for Solving the Problems

To solve the above problems, the mechanical seal device of the present invention is a mechanical seal device for sealing an interspace between a housing and a rotary shaft penetrating an aperture formed on the housing to seal fluid inside the housing, comprising: a rotary ring provided on the rotary shaft and having a seal surface at one end portion in the axial direction of the rotary shaft; a stationary ring provided in the housing and having a counter surface arranged in a counter manner to the seal surface of the rotary ring, the stationary ring comprising a first seal surface circularly formed on the counter surface, the first seal surface sealingly contacting to and sliding on the seal surface of the rotary shaft, a second seal surface circularly formed on an outer circumference side or on an inner circumference side of the first seal surface of the counter surface in isolation from the first seal surface, the second seal surface sealingly contacting to and sliding on the seal surface of the rotary shaft, a sealing groove formed between the first seal surface and the second seal surface, and a plurality of fluid passages formed inside of the stationary ring, one aperture of each of the fluid passages communicating to the sealing groove, and a quenching fluid supplying passage communicating to the other aperture of each of the fluid passages formed inside of the stationary ring, the quenching fluid supplying passage causing a flow of the quenching fluid into and/or from the sealing groove via the fluid passages.

According to the mechanical seal device of the present invention having such a constitution, since the quenching fluid is poured into the groove provided on the seal surface, that is, the sealing groove between the first seal surface and the second seal surface (the seal surface for objective fluid and the seal surface for the quenching fluid) which are doubly formed on the stationary ring (stationary seal ring), it is possible to directly pour the quenching fluid against sliding rings (stationary seal ring, rotary seal ring), so that a wash can be performed efficiently, a shutoff from the atmosphere can be appropriately executed, and effects that are lubricating, cooling and compulsory discharging of the sealed fluid are efficiently achieved.

Preferably, the mechanical seal device of the present invention comprises a seal cover provided on the housing, wherein the quenching fluid supplying passage comprises an intermediate chamber formed in an inner circumferential portion of the seal cover, a quenching inlet formed by penetrating the seal cover for supplying the quenching fluid into the intermediate chamber, and a quenching outlet formed by penetrating the seal cover for discharging the quenching fluid from the intermediate chamber, and wherein the other aperture of each of the fluid passages in the stationary ring communicates to the intermediate chamber.

According to the mechanical seal device of the present invention having such a constitution, the quenching fluid leaks neither to an inside space B nor to an outside space A.

Further preferably, in the mechanical seal device of the present invention, the quenching inlet is formed on the downside in the vertical direction, and the quenching outlet is formed on the upside in the vertical direction.

According to the mechanical seal device of the present invention having such a constitution, the quenching fluid can be poured from the downside toward the upside, so that it is able to fill the sealing groove and the fluid passage connected thereto with the quenching fluid without remaining air inside. Further, though the quenching fluid introduced into the sealing groove of the stationary ring absorbs heat generated on the seal surfaces (sliding surfaces) to cool them, temperature of the quenching fluid itself is raised at that time, so that the quenching fluid flows relatively upward. In the mechanical seal device of the present invention, since the quenching fluid is discharged from the upside, the high temperature quenching fluid can be appropriately discharged and the low temperature quenching fluid can be introduced at downside, so that efficiency of cooling can be enhanced. Further, as a result of forming such flow of the quenching fluid, even if a diameter of the fluid passage for pouring the quenching fluid toward the seal surfaces is narrow, flowing of the quenching fluid can be appropriately maintained by the flow of the quenching fluid generated in the seal groove, so that the efficiency of cooling also can be appropriately maintained.

Further preferably, in the mechanical seal device of the present invention further comprises a bellows for separating the intermediate chamber and space on the sealed fluid side, and elastically pressing the stationary ring toward the rotary ring.

According to the mechanical seal device of the present invention having such a constitution, even if the sealing-fluid includes slurry, deterioration of actuating performance of the secondary seal can be prevented, so that leakage of the sealing-fluid is prevented to maintain the efficiency of sealing can be appropriately maintained.

Further preferably, the mechanical seal device of the present invention further comprises a second elastic forcing means for elastically pressing the stationary ring toward the rotary ring with the bellows.

According to the mechanical seal device of the present invention having such a constitution, since the stationary ring is pressed by the elastic forcing means in addition to the bellows, in a case that two seal surfaces are provided, the seal surface of the stationary ring is pressed to the rotary ring with suitable force to maintain the efficiency of sealing can be appropriately maintained.

BEST MODE FOR CARRYING OUT THE INVENTION

A mechanical seal device as an embodiment of the present invention is explained below in reference to FIG. 1 to FIG. 3.

In the present embodiment, a mechanical seal device used as a shaft seal of a centrifugal pump is exemplified to explain the present invention.

Figure 1:
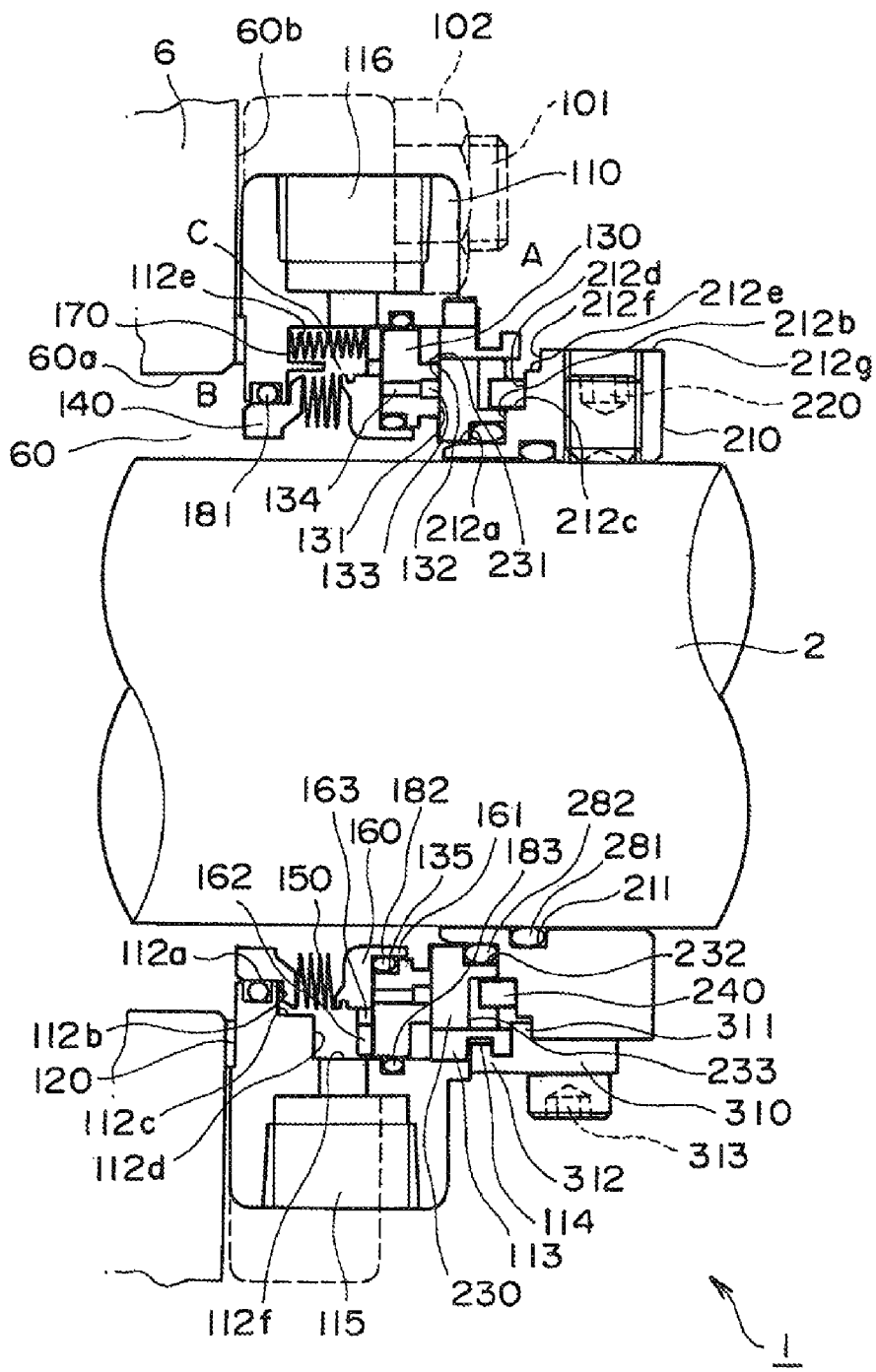
FIG. 1 is a figure showing a constitution of a mechanical seal device of an embodiment of the present invention and a sectional view showing a state that the mechanical seal device is mounted on a shaft penetrating portion of a centrifugal pump

As shown in FIG. 1, the mechanical seal device 1 is provided to a rotary shaft 2 penetrating an aperture 60 formed on a casing 6 of an apparatus body of the centrifugal pump (below, simply referred to as the casing 6) to be extended between the inside and the outside of the centrifugal pump, and it seals an interspace between the rotary shaft 2 and the casing 6 in the place where the aperture 60 is formed. By this constitution, the mechanical seal device 1 seals the inside of the centrifugal pump from the outside thereof to prevent fluid in the apparatus (sealing-fluid) from leaking outside, and also to keep the air outside (the atmosphere) from entering into the inside of the apparatus.

Note that, in FIG. 1, the left side of the figure is the inside of the apparatus, which is the inner space of an inner circumference surface 60a of the aperture 60 of the casing 6 is the inside space B, and the right side of the figure is the outside of the apparatus (the atmosphere side), which is the outside space (the atmosphere space) re A.

The mechanical seal device 1 comprises a seal cover 110, a stationary seal ring 130, a metallic bellows 150, coil springs 170, a seal collar 210 and a rotary seal ring 230 as principal parts.

As mentioned above, the rotary shaft 2 passes through the aperture 60 of the casing 6 of the mechanical seal device 1 to penetrate between the inside and the outside of the apparatus, and it is supported in the rotatable condition by a bearing not shown in figures. On an outer surface 60b around an end portion on the outside of the aperture 60 (a circumference surface of the outer end portion of the aperture) penetrated by the rotary shaft 2, four embedded bolts 101 are embedded from the inside to the outside, and the mechanical seal device 1 is mounted to the embedded bolts 101.

Figure 3:
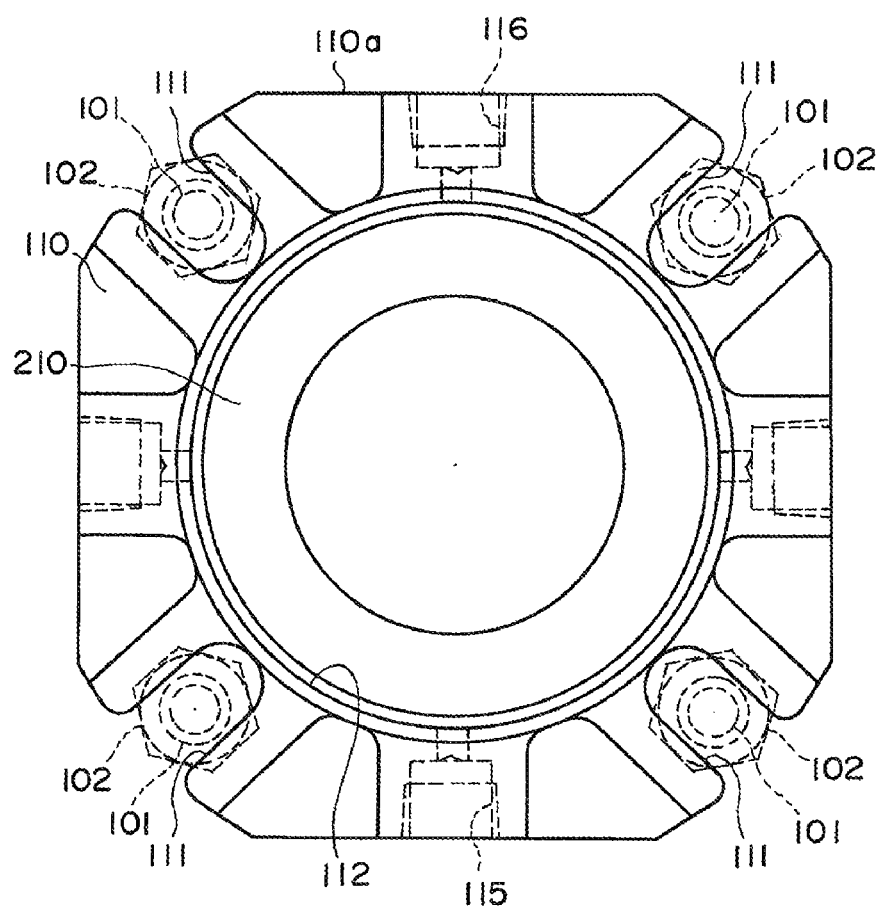
FIG. 3 is a front view of a state that a seal cover and a seal collar are joined together in the mechanical seal device shown in FIG. 1.

The seal cover 110 is, as shown in FIG. 3, formed into the almost quadrangle shape in the front elevation shape, and U-shape fixing grooves 111 are provided from the center toward four corners. By passing the embedded bolts 101 embedded on the circumference surface 60b of the aperture outer end portion of the casing 6 through the fixing grooves 111 to fasten the bolts by through nuts 102, the seal cover 110 is fixed to and set to the casing 6.

Further, a gasket 120 made from rubber, resin or soft metal wrapped in a rubber layer is provided between the seal cover 110 and the casing 6.

In the center of the seal cover 110, as shown in FIG. 3, an aperture 112 is formed, in which, when the seal cover 6 is set to the casing 6, the aperture 112 becomes a member of a series of penetrating apertures which continue into the aperture 60 of the casing 6 and through which the rotary shaft 2 is passed.

The inner circumference surface of the aperture 112 of the seal cover 110 is formed, as shown in FIG. 1, into inner circumference surfaces 112a, 112c and 112f which are formed into a stair-like cross-sectional shape in a manner that the diameters thereof become gradually larger from the inside to the outside. Further, an annular step surface 112b parallel to the radial direction is formed between the inner circumferential surface 112a and the inner circumferential surface 112c, and an annular step surface 112d parallel to the radial direction is formed between the inner circumferential surface 112c and the inner circumferential surface 112f.

At an outermost portion of the aperture 112 of the seal cover 110, that is, at an outside end portion of the inner circumferential surface 112f, an annular position decision portion 113 is formed in a manner protruding toward the outside in the axial direction and the inside in the radial direction. On the outer circumferential surface of the position decision portion 113, a position decision groove 114 is formed. When the rotary seal ring 230 is mounted on the rotary shaft 2, the set plates 310 are engaged with the position decision groove 114 in a manner described below, so that a fixing position of the rotary seal ring 230 is determined.

Further, in the seal cover 110, a quenching inlet 115 and a quenching outlet 116, which penetrates the seal cover 110 from the outer circumference surface 110a into the inner circumference surface 112f with the largest inner diameter, is formed. Though both the quenching inlet 115 and the quenching outlet 116 are bores directly connected to an intermediate chamber C formed inside of the seal cover 110, in the present embodiment, in the centrifugal pump established in the condition that the axial direction of the centrifugal pump is set to the horizontal direction, the aperture arranged on the downside in the vertical direction is applied for the quenching inlet 115, and the aperture arranged on the upside in the vertical direction is applied for the quenching outlet 116. Therefore, quenching fluid is poured into the mechanical seal device 1 from the downside in the vertical direction, and discharged outside from the upside in the vertical direction.

Note that, at each port on the end portion side of the quenching inlet 115 and the quenching outlet 116, an internal thread for a pipe connectable with the external pipe is formed.

In the inner circumference surface 112a which is arranged at the innermost of the seal cover 110 and has the narrowest diameter, a case 140 is fitted with an O-ring 181 therebetween. The O-ring 181 is provided in an annular groove formed in the inner circumference surface 112a of the seal cover 110.

An outside end surface of the case 140 protrudes toward and into the inside of the inner circumference surface 112c which has a larger diameter than the inner circumference surface 112a, and an annular surface of an inside end portion of a metallic bellows 150 is welded to the outside end surface of the case 140 in the seal contact condition.

The metallic bellows 150 is a component as a spring means with a constitution that the cross-sectional shape between an inner circumference face and an outer circumference face of a cylinder state is a corrugated cross-sectional shape, a continuous V-shape, or a shape bended in Z-state, by executing the drawing working to the metallic plates made from stainless steel, copper alloy and the like into a bellows state and into an annular state, or by welding the annular metallic plates made from stainless steel, copper alloy and the like to form the cylinder state in the condition that an inner circumference of each of the annular plates are welded to an outer circumference of the adjoining annular plate. That is, the metallic bellows 150 is the spring means with elastic force based on reaction force against the constitution that a middle portion of the cylinder is bended in various manners.

An annular surface of an outside end portion of the bellows 150 is sealingly connected to a ring-shape retainer 160 by welding and the like.

In an inner circumference portion of the outside of the retainer 160, a cylinder portion 161 protruding along the shaft outer circumference surface to the further outside in a ring condition is formed, and the stationary seal ring 130 is fitted on an outer circumference surface of the cylinder portion 161.

At a corner portion on the inside on the inner circumference surface of the stationary seal ring 130, a groove with steps 135 for an O-ring is formed, and the stationary seal ring 130 is fitted on the outer circumference surface of the cylinder portion 161 of the retainer 160 with the O-ring 182 provided in the groove with steps 135.

As mentioned above, by the case 140, the metallic bellows 150 and the retainer 160 sealingly connected each other by the welding and the like, and by the O-ring 181 and 182, the inside space B which is the inside of the apparatus and the intermediate chamber C which is the inside of the seal cover 110 are divided into parts and shut off.

Further, an outer circumference surface of the stationary seal ring 130 is seal contact with the inner circumference surface 112f of the seal cover 110 in a movable condition in the axial direction with O-ring 183 therebetween. By this constitution, the intermediate chamber C inside of the seal cover 110 is sealed against the outside (atmosphere side) space A.

Further, an outer circumference portion of the outside end portion of the retainer 160 is annularly expanded along the inside end surface of the stationary seal ring 130 close to the inner circumference surface 112f of the seal cover 110 to form a flange portion 162.

In the step surface 112d of the seal cover 110, spring receiving concave portions 112e on which one end portions of coil springs 170 are respectively set are formed. The spring receiving concave portions 112e are formed in the uniform distribution along a ring-shape surface of the step surface 112d.

The coil springs 170 are provided between the step surface 112d of the seal cover 110 and the flange portion 162 of the retainer 160 to force the retainer 160 toward the outside, that is, toward the rotary seal ring 230, with the metallic bellows 150.

An inside end portion of each coil spring 170 is inserted into and fixed to the spring receiving concave portion 112e, and an outside end portion of each coil spring 170 is connected to the flange portion 162 of the retainer 160 by the welding and the like.

The coil springs 170 are provided at some predetermined positions in the uniform distribution along the circumference of the shaft.

Further, quenching use bores 163 penetrating the retainer 160 in the axial direction are formed near the inside in the radial direction of the flange portion 162 of the retainer 160. The quenching use bores 163 keep suitable communication state between the intermediate chamber C and quenching use bores 134 formed in the stationary seal ring 130, so that it becomes easy for the quenching fluid to flow in or flow out from the intermediate chamber C into the quenching use bores 134 of the stationary seal ring 130. The quenching use bores 163 are formed corresponding to the quenching use bores 134 of the stationary seal ring 130, and about 6 to 8 bores are formed in the uniform distribution along the circumference of the flange portion 162.

The stationary seal ring 130 is an annular seal member whose cross-sectional shape is about rectangle, and the outside end surface thereof comprises duplex seal surfaces 131 and 132 respectively protruding annularly. Two seal surfaces 131 and 132 are in seal contact with and slide on a seal surface 231 of the rotary seal ring 230 mentioned below, to respectively seal between the inside and the outside in the radial direction.

Figure 2:
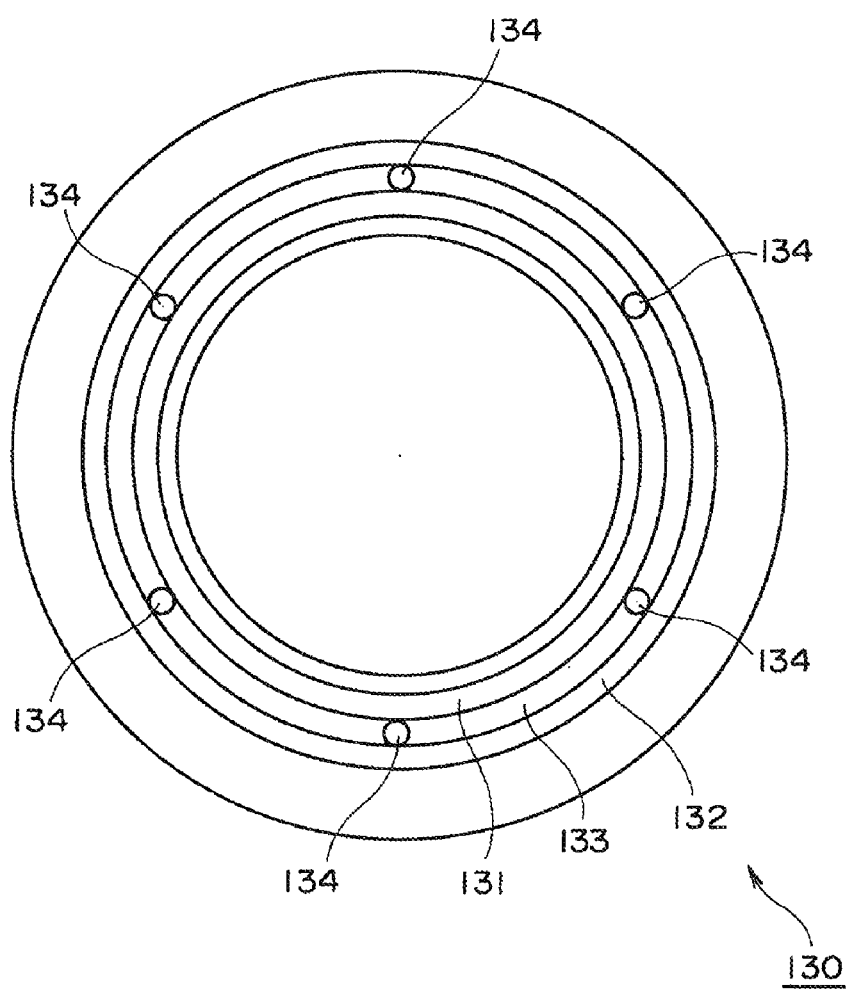
FIG. 2 is a figure showing a seal surface of a stationary seal ring of the mechanical seal device shown in FIG. 1.

As shown in FIG. 1 and FIG. 2, a sealing groove 133 is formed between the two seal surfaces 131 and 132, and the 6 to 8 quenching use bores 134 penetrating the stationary seal ring 130 in the axial direction is formed in the sealing groove 133. The quenching use bores 134 are formed in the uniform distribution along the sealing groove 133.

The quenching use bores 134 are communicated with the quenching use bores 163 of the above mentioned retainer 160, and the quenching fluid flowing into the intermediate chamber C via the quenching inlet 115 further flows into the sealing groove 133 via the quenching use bores 134. Further, the quenching fluid flowing into the sealing groove 133 is discharged into the intermediate chamber C via the quenching use bores 134.

As mentioned above, in the mechanical seal device 1, the quenching fluid is poured into the intermediate chamber C of the seal cover 110 from the quenching inlet 115 arranged on the downside in the vertical direction, and the quenching fluid is discharged outside from the quenching outlet 116 arranged on the upside in the vertical direction. In this case, since the quenching fluid near the seal surface increases in temperature by the sliding-heat-generating to flow upward and new quenching fluid with lower temperature flows into the space near the seal surface from the downside, the circulation of the quenching fluid near the seal surface is suitably carried out. Since similar flow is generated for the quenching fluid flowing into the sealing groove 133 of the stationary seal ring 130, air is prevented from staying in the sealing groove 133, so that the sealing groove 133 is appropriately filled with the quenching fluid.

Therefore, the seal surface 131 on the inner circumference side of the stationary seal ring 130 acts as the objective fluid seal 131 for sealing the inside space B on the inner circumference side from the quenching fluid on the outer circumference side, and the seal surface 132 on the outer circumference side acts as the quenching fluid seal 132 for sealing the quenching fluid in the sealing groove 133 on the inner circumference side against the atmosphere space on the outer circumference side.

Note that, material of the stationary seal ring 130 is silicon carbide, carbon, other ceramics or the like.

The seal collar 210 is fitted on the outer circumference surface of the rotary shaft 2 with an O-ring 281 in a sealing groove 211 formed on the inner circumference surface thereof and fixed to the rotary shaft 2 by a set screw 220. As a result, the seal collar 210 becomes integrally rotatable with the rotary shaft 2.

An outer circumference surface of the seal collar 210 is formed into outer circumference surfaces 212a, 212c and 212e which are formed into a stair-like cross-sectional shape in a manner that the diameters thereof become gradually larger from the inside to the outside. Further, an annular step surface 212b which is parallel to the radial direction and faces the inside is formed between the inner circumferential surface 212a and the inner circumferential surface 212c, an annular step surface 212d which is parallel to the radial direction and faces the inside is formed between the inner circumferential surface 212c and the inner circumferential surface 212e, and an annular step surface 212f which is parallel to the radial direction and faces the inside is formed between the inner circumferential surface 212e and the inner circumferential surface 212g.

The rotary seal ring 230 is fitted and fixed on an outer circumference surface of a cylindrical portion extending inside along the outer circumference surface of the rotary shaft 2 as the innermost side portion of the seal collar 210, that is, on the outer circumference of the outer circumference surface 212a.

Further, knock pins 240 for engaging with the rotary seal ring 230 are provided at several points along the circumference on the step surface 212d.

Further, the set plates 310 for determining a position of the seal collar 210 are engaged with the step surface 212f, when the seal collar 210 is mounted and fixed on the rotary shaft 2.

The rotary shaft 230 is an annular seal member whose cross-sectional shape is about rectangle, and the end surface inside in the axial direction thereof is formed as the seal surface 231 which is in contact with and slides on the seal surfaces 131 and 132 of the stationary seal ring 130. This seal surface 231 is in contact with and slides on the objective fluid seal 131 of the stationary seal ring 130, and also in contact with and slides on the quenching fluid seal 132.

The inner circumference surface of the rotary shaft 230 is fitted on an outer circumference surface 212a of an narrower diameter portion on the inside of the seal collar 210 in a manner that the back side of the seal surface 231, that is, the outside end surface of the rotary seal ring 230 is touched to the step surface 212b of the seal collar 210.

At the corner portion on the outside on the inner circumference of the rotary seal ring 230, a groove with steps 232 for an O-ring is formed, and the rotary seal ring 230 is fitted on the outer circumference surface 212a of the seal collar 210 with the O-ring 282 provided in the groove with steps 232. By this, the interspace between the rotary seal ring 230 and the seal collar 210.

On the outside of the outer circumference of the rotary seal ring 230, predetermined number of pin use concave portions 233 are formed in the uniform distribution along the circumference surface thereof. The knock pins 240 provided on the seal collar 210 are inserted to these pin use concave portions 233 to fit the rotary seal ring 230 to the seal collar 210, so that both parts of the seal collar 210 and the rotary seal ring 230 are engaged each other in a manner that they are prevented from relatively moving in the circumferential direction. Further, by the knock pins 240, the rotating force of the rotary shaft 2 and the seal collar 210 is transmitted to the rotary seal ring 230, so that the rotary seal ring 230 rotates integrally with the rotary shaft 2 and the seal collar 210.

Note that, material of the rotary seal ring 230 is silicon carbide, carbon, other ceramics or the like in the same way as the stationary seal ring 130.

Further, material of the O-rings 181 to 183, 281 and 282 is fluoro rubber, H-NBR, EPDM, perfluoroelastomer or the like.

The set plate 310 is a member for, when the seal collar 210 to which the rotary seal ring 230 is fitted is mounted and fixed onto the rotary shaft 2, exactly adjusting the relative distance in the axial direction to the seal cover 110 to which the stationary seal ring 130 is provided, to the predetermined distance. When the rotary seal ring 230 is installed to the rotary shaft 2, the set plate 310 is fitted to the seal collar 210 by using the bolt 313 in a condition that an end surface on the outside of a middle convex portion 311 is touched to the step surface 212f in the outermost circumference of the seal collar 210, so that the relative distance in the axial direction between the set plate 310 and the seal collar 210 is set to the predetermined distance. And then, by engaging the position decision convex portion 312 at the tip end of the set plate 310 to the position decision groove 114 of the position decision portion 113 of the seal cover 110, the relative distance in the axial direction between the set plate 310 and the seal cover 110 is set to the predetermined distance, so that the relative distance in the axial direction between the seal cover 110 and the seal collar 120 to the predetermined distance. In such state, by screwing the set screw 220, the seal collar 210 is fixed and mounted onto the rotary shaft 2.

Note that, the three set plates 310 are set on the circumference surface of the seal collar 210 in the uniform distribution. Further, these set plates 310 are removed after assembling of the mechanical seal device 1.

In the mechanical seal device 1 of the present embodiment with the constitution described above, since the quenching fluid is poured into the groove provided on the seal surface, that is, poured into the sealing groove 133 between the objective fluid seal surface 131 and the quenching fluid seal surface 132 formed doubly and concentrically on the stationary seal ring 130, the seal rings (sliding rings) can be exposed directly to the quenching fluid, so that the washing can be efficiently carried out, the shutoff from the atmosphere can be appropriately carried out, and effects of the lubrication, the cooling, and the compulsory discharging of the sealing-fluid can be efficiently achieved.

Further, in the mechanical seal device 1 of the present embodiment, the quenching use bores 134 penetrating the stationary seal ring 130 in the axial direction is formed in the stationary seal ring 130, and, via the quenching use bores 134, the quenching fluid is poured in and out between the intermediate chamber C and the sealing groove 133. Therefore, the quenching fluid is prevented from leaking into the inside space B and also into the outside space A and it is suitable.

Further, the intermediate chamber C is sealed from the inside space B by the metallic bellows 150 and the O-rings 181, 182 and it also sealed from the outside (the atmosphere side) by the O-ring 183. In the conventional constitution using a packing as a secondary seal for the seal ring movable in the axial direction, and in the case that the sealed fluid includes slurry, the slurry may accumulate between the packing and the shaft, and/or the solidified material may deposit between the packing and the shaft. When it became such condition, the performance of the actuation of the secondary seal deteriorated and there was a possibility that the sealing-fluid leaks. In the present embodiment, however, since the intermediate chamber C is sealed from the sealing-fluid side space, that is, the inside space B by the metallic bellows 150 as the secondary seal for the stationary seal ring 130, the performance of the actuation of the secondary seal of the stationary seal ring 130 never deteriorate, so that the stationary seal ring 130 is in contact with and slides on the rotary seal ring 230 appropriately and the suitable sealing performance can be kept.

Further, since the mechanical seal device 1 of the present embodiment comprises the duplex seal surfaces of the objective fluid seal surface 131 and the quenching fluid seal surface 132, if the inside seal surface wear out due to its operation or the deposited material, the sealing-fluid can be prevented from leaking into the outside, because the outside seal surface is provided.

Further, since the quenching fluid is poured into the sealing groove 133 between the duplex seal surfaces, the sealing-fluid can be efficiently discharged when it becomes such condition.

Further, in the mechanical seal device 1 of the present embodiment, the quenching can be appropriately carried out without lengthening the axial length of the seal device. That is, the mechanical seal device 1 can be downsized, and the quenching can be appropriately carried out in the condition of the length that it is the same as a conventional metallic bellows seal.

Further, since it can be composed in such small size, rising costs can be prevented, and further, it can be installed in the almost all conventional pump without improving it.

Further, in the mechanical seal device 1 of the present embodiment, the aperture provided on the downside in the vertical direction is used for the quenching inlet 115 and the aperture provided on the upside in the vertical direction is used for the quenching outlet 116. Therefore, the quenching fluid can be poured from the downside to the upside, the stationary seal ring 130 and the quenching use bores 134 communicating thereto can be filled with the quenching fluid without remaining air inside thereof. Further, though the quenching fluid introduced into the sealing groove 133 of the stationary seal ring 130 absorbs heat generated on the objective fluid seal surface 131 and the quenching fluid seal surface 132 (and, the seal surface 231 of the rotary seal ring 230) and cools them, since the quenching fluid itself increases in temperature at such time, the quenching fluid flows relatively upward. In the mechanical seal device 1 of the present embodiment, since the quenching fluid is discharged from the upper portion, the quenching fluid with high temperature can be appropriately discharged and the quenching fluid with low temperature can be introduced, so that the cooling efficiency can be increased. Further, by forming such flow of the quenching fluid, even in the condition that the diameter of the quenching use bores 134 for introducing the quenching fluid into the sealing groove 133 is narrow, the flow of the quenching fluid can be appropriately kept by the flow of the quenching fluid generated in the sealing groove 133, so that the effect of the cooling and the like can be appropriately kept.

Note that, the embodiment mentioned above is for easier understanding of the present invention, and the present invention is not limited thereto. Each element disclosed in the present embodiment includes any design change and equivalent within the technical scope of the present invention, and can arbitrarily, preferably and variously be modified.

For example, in the present embodiment, though the duplex seal surfaces of the objective fluid seal surface 131 and the quenching fluid seal surface 132, the sealing groove 133 and the quenching use bores 134 are formed on the stationary seal ring, these may be formed on the rotary seal ring.

Further, details of the components such as the seal cover 110, the stationary seal ring 130, the seal collar 210, the stationary seal ring 230 and/or the like may arbitrarily be changed.

INDUSTRIAL APPLICABILITY

The present invention is applicable to a shaft seal in any apparatus having a rotary shaft, such as a centrifugal pump, an agitation apparatus and the like.

The invention claimed is:

1. A mechanical seal device for sealing an interspace between a housing and a rotary shaft penetrating an aperture formed on said housing to seal fluid inside said housing, comprising:
   a rotary ring provided on said rotary shaft and having a seal surface at one end portion in the axial direction of said rotary shaft;
   a seal cover provided on the housing;
   a case fitted in an inner circumference surface of said seal cover;
   a stationary seal ring;
   a retainer on which the stationary seal ring is fitted;
   a bellows for elastically pressing said stationary ring toward said rotary ring via said retainer, an inside end portion of said bellows being connected to said case, an outside end portion of said bellows being connected to said retainer;
   the stationary ring provided in said retainer and having a counter surface arranged in a counter manner to said seal surface of said rotary ring, said stationary ring comprising
      a first seal surface circularly formed on said counter surface, said first seal surface sealingly contacting to and sliding on said seal surface of said rotary shaft,
      a second seal surface circularly formed on an outer circumference side or on an inner circumference side of said first seal surface of said counter surface in isolation from said first seal surface, said second seal surface sealingly contacting to and sliding on said seal surface of said rotary shaft,
      a sealing groove circularly formed in a part of said isolation between said first seal surface and said second seal surface, and
      a plurality of fluid passages formed inside of said stationary ring, one aperture of each of said fluid passages communicating to said sealing groove, and
   a quenching fluid supplying passage communicating to the second aperture of each of said fluid passages formed inside of said stationary ring, said quenching fluid supplying passage causing a flow of said quenching fluid into and/or from said sealing groove via said fluid passages, said quenching fluid supplying passage comprising an intermediate chamber formed in an inner circumferential portion of said seal cover, wherein said bellows separates said intermediate chamber and space on the seal fluid side, said intermediate chamber is surrounded by said seal cover, said case, said bellows, said retainer and said stationary ring, an interspace between said stationary ring and said seal cover is sealed by a seal member therebetween, the second aperture of each of said fluid passages in said stationary ring communicates to said intermediate chamber, so that said intermediate chamber and said sealing groove of said stationary ring is communicated by said plurality of fluid passages, and said first seal surface and said second seal surface of said stationary ring are formed as a duplex seal surfaces, one of them acting as a seal for sealing said seal fluid inside said housing from said quenching fluid in said sealing groove, the other acting as a seal for sealing said quenching fluid in said sealing groove against space outside of said housing.

2. A mechanical seal device as set forth in claim 1, wherein said quenching fluid supplying passage comprises said intermediate chamber,
 a quenching inlet formed by penetrating said seal cover for supplying said quenching fluid into said intermediate chamber, and
 a quenching outlet formed by penetrating said seal cover for discharging said quenching fluid from said intermediate chamber.

3. A mechanical seal device as set forth in claim 1, further comprising a second elastic forcing means for elastically pressing said stationary ring toward said rotary ring with said bellows.

4. A mechanical seal device as set forth in claim 2, wherein said quenching inlet is formed on the downside in the vertical direction, and said quenching outlet is formed on the upside in the vertical direction.

5. A mechanical seal device as set forth in claim 4, further comprising a second elastic forcing means for elastically pressing said stationary ring toward said rotary ring with said bellows.

\* \* \* \* \*